(12) United States Patent
Furuskar et al.

(10) Patent No.: US 8,681,721 B2
(45) Date of Patent: Mar. 25, 2014

(54) METHOD FOR LINK ADAPTATION WITH A SIGNAL QUALITY MARGIN BASED ON THE BANDWIDTH

(75) Inventors: Anders Furuskar, Stockholm (SE); Johan Bergman, Stockholm (SE); Eva Englund, Linkoping (SE); Kristina Jersenius, Linkoping (SE); George Jongren, Stockholm (SE); Magnus Lundevall, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 417 days.

(21) Appl. No.: 12/993,925

(22) PCT Filed: May 23, 2008

(86) PCT No.: PCT/SE2008/050614
§ 371 (c)(1),
(2), (4) Date: Nov. 22, 2010

(87) PCT Pub. No.: WO2009/142564
PCT Pub. Date: Nov. 26, 2009

(65) Prior Publication Data
US 2011/0128930 A1 Jun. 2, 2011

(51) Int. Cl.
*H04W 4/00* (2009.01)

(52) U.S. Cl.
USPC ............ 370/329; 370/328; 370/252; 455/517

(58) Field of Classification Search
USPC .......... 375/133, 316, 146, 224, 350; 370/392, 370/329, 252, 230, 389; 709/238; 331/1 A; 700/94
See application file for complete search history.

(56) References Cited

U.S. PATENT DOCUMENTS

| 8,009,985 | B1 * | 8/2011 | Roberts et al. .................. 398/47 |
| 2004/0184398 | A1 * | 9/2004 | Walton et al. ................. 370/203 |
| 2005/0122912 | A1 * | 6/2005 | Jeon et al. ..................... 370/252 |
| 2006/0114858 | A1 | 6/2006 | Walton et al. |
| 2007/0189212 | A1 * | 8/2007 | Awad et al. ................... 370/328 |
| 2009/0247180 | A1 * | 10/2009 | Higuchi et al. ............ 455/452.2 |

FOREIGN PATENT DOCUMENTS

| EP | 1783943 A1 | 5/2007 |
| EP | 1783943 A1 * | 5/2007 |

* cited by examiner

*Primary Examiner* — Andrew Lai
*Assistant Examiner* — Jamaal Henson
(74) *Attorney, Agent, or Firm* — Coats and Bennett PLLC (57) ABSTRACT

Method and arrangement in a base station for selecting a transmission parameter. The selected transmission parameter is used when sending a signal over a radio channel to a user equipment in a wireless communication network. The radio channel is allocated bandwidth for signalling. The method comprises the step of obtaining an estimation of the signal quality of the radio channel. Also, the allocation to the radio channel. Further yet, the method may comprise the step of calculating a signal quality margin, which signal quality margin is based on the bandwidth size. Still further, the method comprises the step of selecting the transmission parameter based on the estimated signal quality of the radio channel and the calculated signal quality margin.

16 Claims, 4 Drawing Sheets

METHOD FOR LINK ADAPTATION WITH A SIGNAL QUALITY MARGIN BASED ON THE BANDWIDTH

TECHNICAL FIELD

The present invention relates to a method and an arrangement in a first node. More particularly the present invention relates to a mechanism for improved selection of transmission parameters.

BACKGROUND

Currently, standardized and commercially deployed radio access technologies are proliferated. Such radio access technologies include the Global System for Mobile communications (GSM), Enhanced Data Rates for GSM Evolution (EDGE), General Packet Radio System (GPRS), wide-band code division multiple access (WCDMA), Long Term Evolution (LTE) systems, wireless local area networks (WLAN), CDMA 2000 and others.

The radio channels in such wireless systems may vary or deteriorate over time and frequency. This is due to e.g. propagation gain, as transmitted radio signals reflects and produces reflected signals that may interfere with each other in a constructive or destructive way. Thus the signals may amplify or become impaired by the interference from reflected radio waves.

There are several known techniques to adapt to, and utilize this phenomenon. In particular, these techniques may include channel dependent scheduling and link adaptation.

Channel dependent scheduling can be used to schedule transmissions to and from a terminal at time and/or frequency instants for which the radio channel is particularly good.

Link adaptation adapts transmission parameters, typically modulation and channel coding, in order to reach some desired objective, e.g. to maximize bit rate or to minimize delay.

Both these techniques rely on measurements of the radio channel. Such measurements are done some time before they are used by the scheduling and link adaptation mechanisms. Since the radio channel varies over time, and because of the delay in time, the measurements will not be fully accurate when used. To mitigate this, a margin can be used, so that even if the radio channel deteriorates somewhat, the applied transmission parameters are appropriate. However, using such margin also means that e.g. a modulation and encoding scheme which is unnecessarily robust may be selected, instead of modulation and coding scheme allowing for a higher bit rate transfer.

In conventional wireless systems the scheduled bandwidth is constant. In such cases a fixed margin works satisfactory. In many modern wireless systems however, employing frequency domain scheduling, the allocated bandwidth differs dramatically. A consequence of this is that the channel variations between measurement and usage also differ. In such cases using a single margin may lead to performance loss as the margin has to be rather big to cover the variations over time of the radio channel.

SUMMARY

It is therefore an object of the present invention to provide a mechanism in a wireless communication system for improved selection of transmission parameters.

According to a first aspect, the object is achieved by a method in a first node for selecting a transmission parameter. The selected transmission parameter is used when sending a signal over a radio channel to a second node. The first node and the second node are comprised within a wireless communication network. The radio channel is allocated a bandwidth for signalling. The method comprises the step of obtaining an estimation of the signal quality of the radio channel. Also, the method comprises the step of obtaining the size of the bandwidth for allocation to the radio channel. Further yet, the method may comprise the step of calculating a signal quality margin, which signal quality margin is based on the bandwidth size. Still further, the method comprises the step of selecting the transmission parameter based on the estimated signal quality of the radio channel and the calculated signal quality margin.

According to a second aspect, the object is also achieved by an arrangement in a first node, for selecting a transmission parameter. The transmission parameter is to be used when sending a signal over a radio channel to a second node. The first node and the second node are comprised within a wireless communication network. The radio channel is allocated a bandwidth for signalling. The arrangement comprises a first obtaining unit. The first obtaining unit is adapted to obtain an estimation of the signal quality of the radio channel. The arrangement also comprises a second obtaining unit. The second obtaining unit is adapted to obtain the size of the bandwidth for allocation to the radio channel. Further, the arrangement comprises a calculating unit. The calculating unit is adapted to calculate a signal quality margin. The signal quality margin is calculated based on the bandwidth size. Further yet, the arrangement comprises a selecting unit. The selecting unit is adapted to select the transmission parameter based on the estimated signal quality of the radio channel and the calculated signal quality margin.

Since a link adaptation margin that depends on the allocated bandwidth is used, and which margin is adapted to the radio propagation conditions on that particular allocated bandwidth, a more accurate link adaptation may be made, resulting in the use of a more appropriate transmission parameters, such as e.g. modulation and coding scheme. Thus the signal quality may be increased, the system capacity may be amplified, and the coverage of the cell may be improved.

BRIEF DESCRIPTION OF THE DRAWINGS

The present invention will now be described more in detail in relation to the enclosed drawings, in which.

DETAILED DESCRIPTION

Embodiments herein include a method and an arrangement in a first node. These embodiments are provided so that this disclosure will be thorough and complete, and will fully convey the scope of the invention to those skilled in the art. It should be understood that there is no intent to limit the present method and arrangement in a first node to any of the particular forms disclosed, but on the contrary, the present method and arrangement in a first node is to cover all modifications, equivalents, and alternatives falling within the scope of the invention as defined by the claims.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

Figure 1:
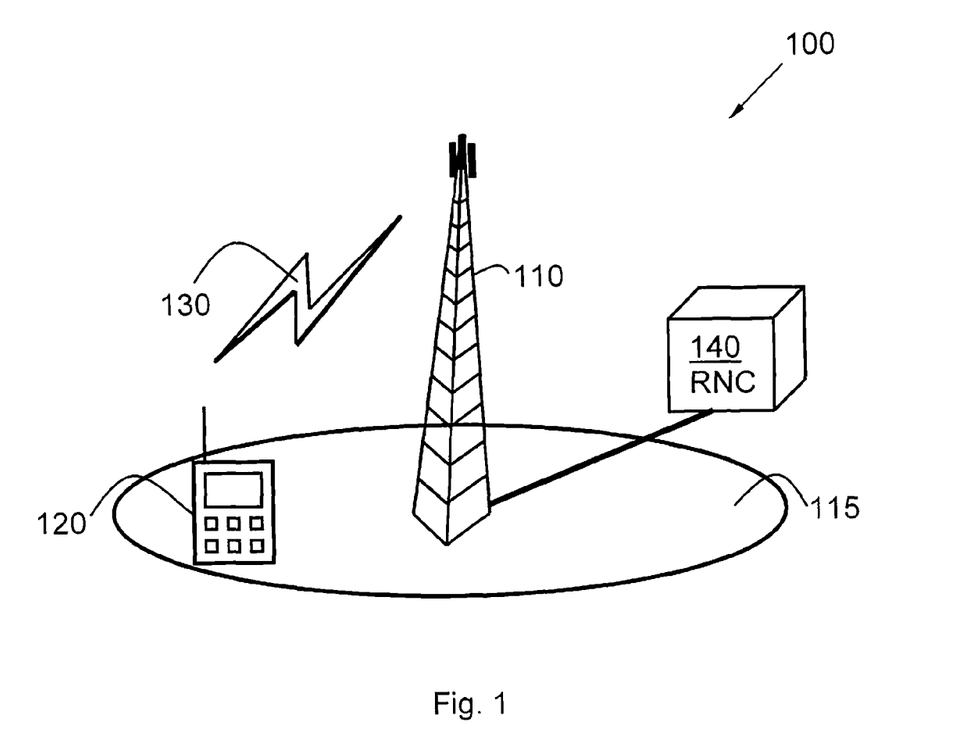
FIG. 1 is a schematic block diagram illustrating a wireless communication system according to some embodiments.

FIG. 1 is a schematic block diagram illustrating a wireless communication network 100 according to some embodiments. The wireless communication network 100 comprises a first node 110 in a cell 115.

The first node 110 may also be referred to as e.g. a base station, an access point, a Node B, an eNode B and/or a base transceiver station. Access Point Base Station, base station router, etc depending e.g. of the radio access technology and terminology used.

The wireless communication network 100 further comprises a second node 120. The second node 120 may be represented by a user equipment, e.g. a wireless communication terminal, a mobile cellular telephone, a Personal Digital Assistant (PDA), a laptop, a computer or any other kind of device capable of managing radio resources may communicate wirelessly with the first node 110 within the cell 115 over a channel 130.

The wireless communication network 100 may also comprise a control node 140. The control node 140 may be e.g. a Radio Network Controller. The control node 140 is a governing element in the wireless communication network 100, which may be responsible for the control of base stations such as e.g. the first node 110, which are connected to the control node 140. The control node 140 may carry out radio resource management and some of the mobility management functions.

The radio access technologies used for wireless communication within the wireless communication network 100 may comprise technologies such as e.g. Code division multiple access (CDMA), Wideband Code Division Multiple Access (WCDMA), CDMA 2000, High Speed Downlink Packet Data Access (HSDPA), High Data Rate (HDR) etc, just to mention a few examples.

As used herein, the wireless communication network 100 may refer to various radio access technologies in the traditional sense, a wireless local area network (LAN) or a wireless personal area network without departing from the teachings of the present invention. These networks 100 may include, for example, radio access technologies, such as Enhanced Data rates for GSM Evolution (EDGE), General Packet Radio Service (GPRS), Global System for Mobile Telecommunications (GSM), High Speed Packet Data Access (HSPA), Universal Mobile Telecommunications System (UMTS) and/or Wireless Local Area Networks (WLAN), such as Wireless Fidelity (WiFi) and Worldwide Interoperability for Microwave Access (WiMAX), Bluetooth or according to any other wireless communication standard.

The present methods and arrangements are appropriate for use, in particular in wireless communication networks 100, comprising multi carriers with varying bandwidth.

Figure 2:
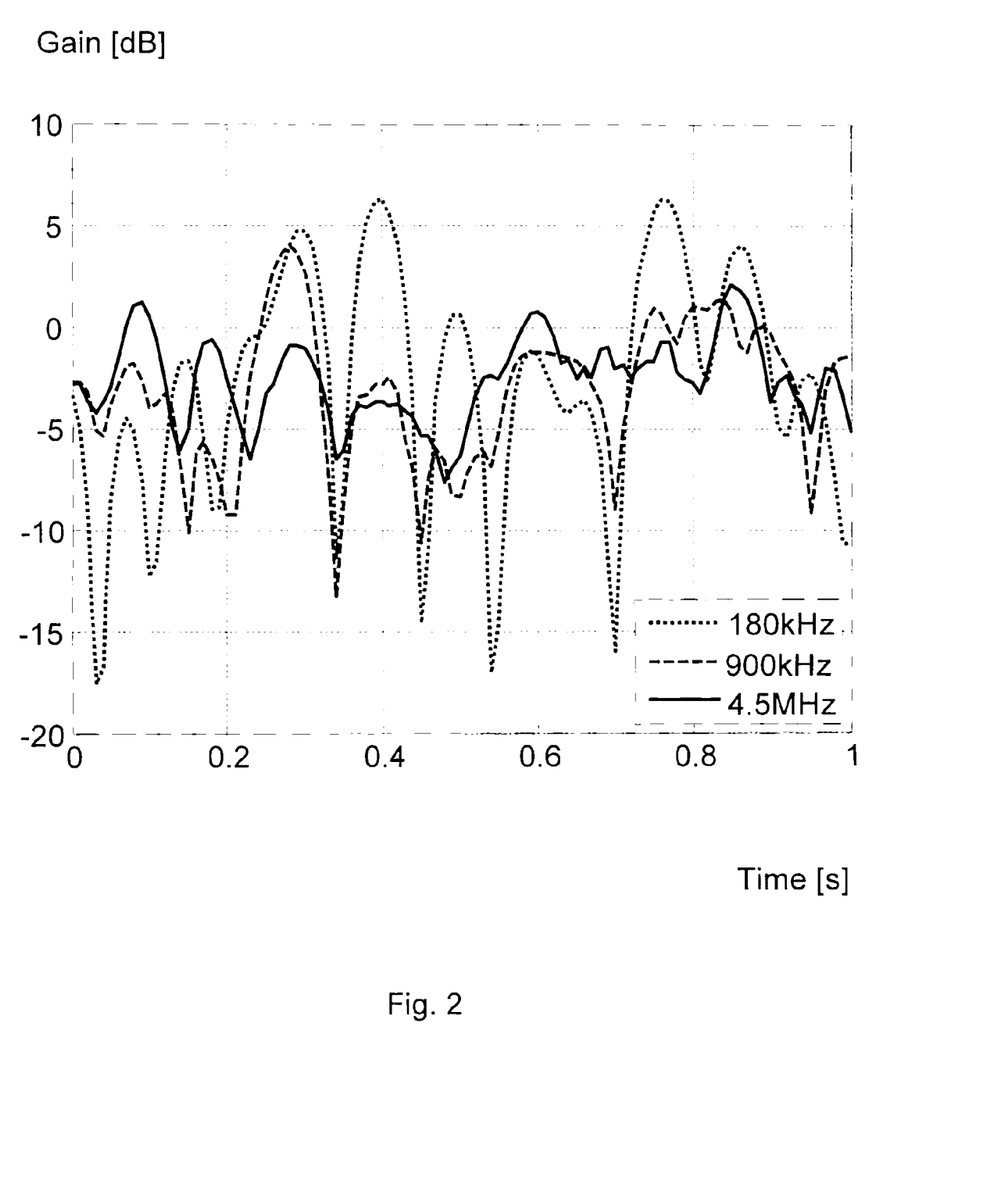
FIG. 2 is a schematic block diagram illustrating variations over time for different bandwidths.

FIG. 2 illustrates channel variations over time for different allocated bandwidths. The extent of variations in the radio channel 130 depends inter glia on the bandwidth of the channel 130.

An average measured over a wide bandwidth varies less than an average over a narrower bandwidth, as may be read from FIG. 2. The reason is that a wide bandwidth means averaging over more fading realizations, which lowers the variance.

Embodiments herein use a link adaptation margin which is adapted and proportional, or at least related to, the bandwidth. For a broader bandwidth thus a smaller margin may be applied than for a narrower bandwidth.

Thus the link adaptation margin may be a continuous or discrete inversed function of the bandwidth size.

Figure 3:
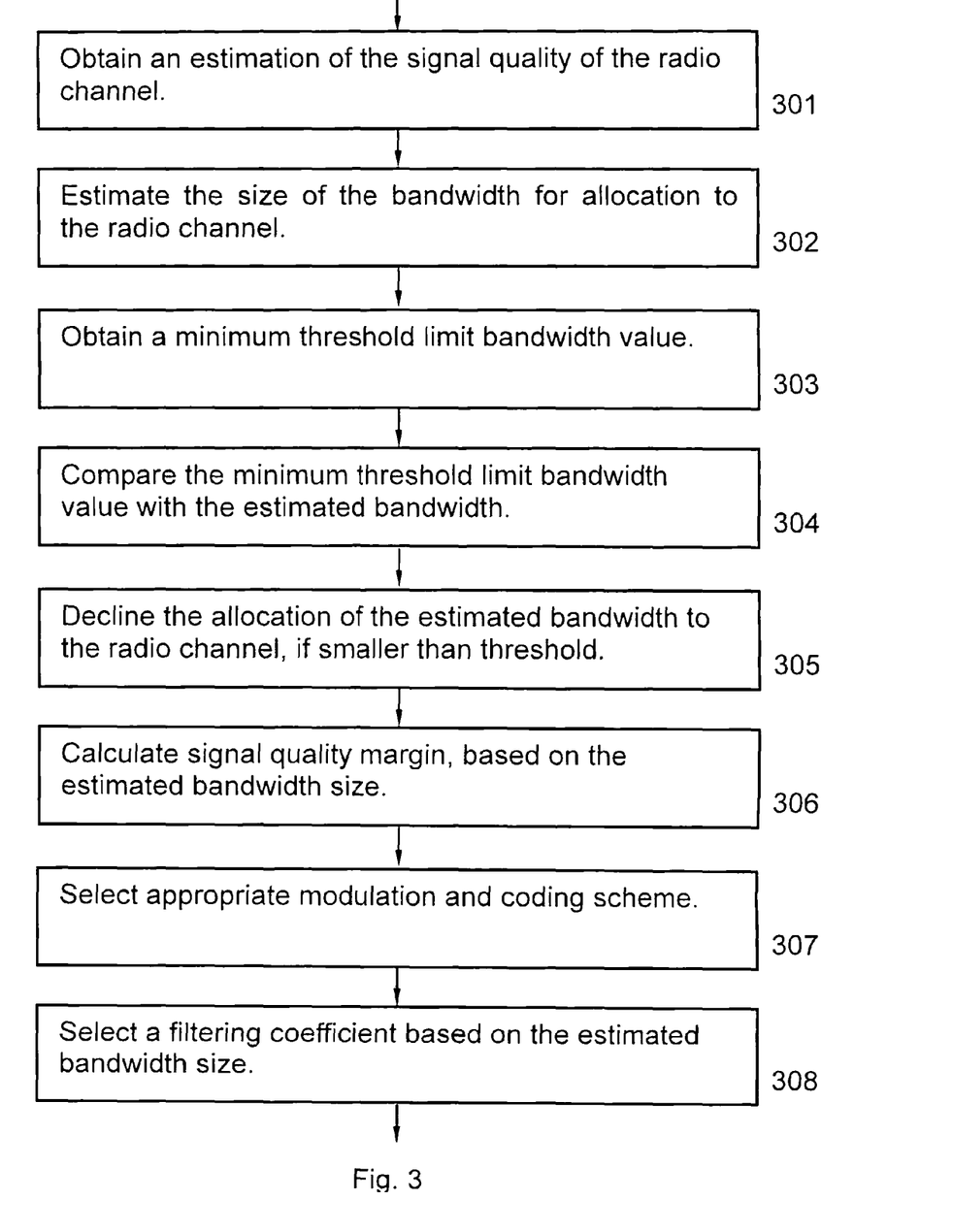
FIG. 3 is a flow chart illustrating a method in a first node according to some embodiments.

FIG. 3 is a schematic flow chart illustrating the method in the first node 110 for selecting a transmission parameter, according to some embodiments. The transmission parameter is used when sending a signal over a radio channel 130 to a second node 120. The second node 120 may be represented by a user equipment such as a mobile telephone. The first node 110 and the second node 120 are comprised within a wireless communication network 100. The radio channel 130 is allocated a bandwidth for signalling.

The first node 110 may be represented by a base station. According to some embodiments however, the first node 110 may be represented by a user equipment. The first node 110 may further, according to some embodiments, be represented by a control node, such as e.g. a Radio Network Controller (RNC). Further, the performance of certain method steps may be performed in one node, e.g. the user equipment, and other method steps may be performed in another node e.g. the base station.

The transmission parameter to be selected may comprise at least one parameter out of the group: modulation and coding scheme, transmission power, number of MIMO streams, filtering coefficient.

A link adaptation margin is, according to the present method computed based on the bandwidth. The link adaptation margin may in turn be used e.g. together with other input such as e.g. channel quality, to select a transmission parameter.

To appropriately select transmission parameter, the method may comprise a number of steps 301-308. It is however to be noted that some of the described method steps are optional and only comprised within some embodiments. Further, it is to be noted that the method steps 301-308 may be performed in another chronological order than the enumeration indicates and that some of them, e.g. step 302 and step 303, or even all steps may be performed simultaneously or in an altered, arbitrarily rearranged, decomposed or even completely reversed chronological order. The method may comprise the following steps:

Step 301

An estimation of the signal quality of the radio channel 130 is obtained.

According to some optional embodiments, an estimation of the signal quality of the radio channel 130, may be made in the first node 110. The estimation may be performed by receiving pilot signals from the second node 120. The received pilot signals may then be compared with the expected signal values. From this comparison, a Signal to Interference and Noise Ratio (SINR) value, or another appropriate quality measurement value, may be estimated based on the difference between the received pilot signals and the expected signal values.

According to some embodiments, the estimation of the signal quality of the radio channel 130 may be measured in the second node 120 and be provided to the first node 110, e.g. by means of signalling. According to yet some embodiments, the estimation of the signal quality of the radio channel 130 may be measured in another network node, such as e.g. the control node 140, and be provided to the first node 110.

Step 302

The size of the bandwidth for allocation to the radio channel 130 is obtained. The size of the bandwidth may typically be known by the system.

Step 303

This step is optional and is only performed in some embodiments. A minimum threshold limit bandwidth value may be obtained. The minimum threshold limit bandwidth value may be preset and provided e.g. as a system parameter by the system operator.

Step 304

This step is optional and is only performed in some embodiments. The minimum threshold limit bandwidth value may be compared with the bandwidth. Thus an estimation may be made, whether the allocated bandwidth is smaller than the threshold limit bandwidth value.

Step 305

This step is optional and is only performed in some embodiments. The allocation of the bandwidth to the radio channel 130 may be declined if the bandwidth is less than the minimum threshold limit bandwidth value.

Thus the allocation of a bandwidth smaller than a certain predetermined threshold limit bandwidth value may be either completely avoided or provided with a penalty, or given negative priority.

Step 306

A signal quality margin is calculated. The signal quality margin is based on the bandwidth size.

The dependence of the bandwidth size when calculating the signal quality margin may according to some embodiments be such that a smaller bandwidth size generates an increased signal quality margin, and a broader bandwidth size, generates a smaller signal quality margin.

The signal quality margin may thus be inversely proportional to the bandwidth size. Thus, according to some embodiments, the relation between the signal quality margin and the bandwidth size may be expressed:

$$\text{Signal Quality Margin} = k \cdot \frac{1}{\text{Bandwidth size}}$$

where k is a proportionality factor.

According to some embodiments, the signal quality margin may be set to a value M1, if the bandwidth is broader than F1 MHz. Further, the signal quality margin may be set to a value M2, if the bandwidth is broader than F2 MHz but smaller than F1 MHz. Further yet, the signal quality margin may be set to a value M3, if the bandwidth is broader than F3 MHz but smaller than F2 MHz. Also, the signal quality margin may be set to a value M4, if the bandwidth is smaller than F3 MHz.

Thus, according to some embodiments, the relation between the signal quality margin and the bandwidth size may be illustrated in Table I:

TABLE I

| If the Bandwidth size (BW) is: | Set the signal quality margin to: |
| --- | --- |
| BW > F1 | M1 |
| F1 > BW > F2 | M2 |
| F2 > BW > F3 | M3 |
| F3 > BW | M4 |

According to some embodiments, M1 may be smaller, or equal to M2. M2 may be smaller, or equal to M3. M3 may be smaller, or equal to M4. Thus, expressed in another way: M1≤5 M2≤5 M3≤5 M4.

According to some embodiments, F1 may be e.g. 5 MHz, F2 may be e.g. 0.9 MHz and F3 may be e.g. 0.18 MHz. However these figures are only intended to serve as non limiting examples.

According to some embodiments, M1, M2, M3 and M4 may be set to values between e.g. approximately 2 dB and 0 dB. However, these figures are mentioned just as non limiting examples, only to facilitate the understanding of the present method and arrangement, and are not intended to limit the scope of protection of the present methods and arrangements.

Step 307

The transmission parameter is selected based on the estimated signal quality of the radio channel 130 and the calculated signal quality margin.

The selection of transmission parameter, such as e.g. modulation and coding scheme, is performed in order to achieve an objective such as e.g. to increase bit rate, reduce delay, improve robustness, enhance the tolerance against interference, decrease signalling redundancy and/or reduce the occurrence of retransmissions.

The modulation and coding scheme may according to some embodiments be e.g. Quadrature Amplitude Modulation (QAM), a modulation scheme which conveys data by changing, or modulating, the amplitude of two carrier waves. These two waves, usually sinusoids, are out of phase with each other by 90° and are thus called quadrature carriers, hence the name of the scheme. In QAM, the constellation points are usually arranged in a square grid with equal vertical and horizontal spacing, although other configurations are possible. Some forms are 16-QAM, 64-QAM, 128-QAM and 256-QAM. By moving to a higher-order constellation, it is possible to transmit more bits per symbol. However, if the mean energy of the constellation is to remain the same, by way of making a fair comparison, the points must be closer together and are thus more susceptible to noise and other corruption. This results in a higher bit error rate and so higher-order QAM can deliver more data less reliably than lower-order QAM, for constant mean constellation energy.

Step 308

This step is optional and may only be performed in some embodiments. A filtering coefficient may be selected, based on the bandwidth size.

According to some further embodiments, the dependence of the bandwidth size when selecting filtering coefficients is typically such that a smaller bandwidth size generates an increased filter length and a broader bandwidth size generates a smaller filter length. This enables following of the rather small variations of a wide band channel, and filtering away the larger variations of a more narrowband channel.

Figure 4:
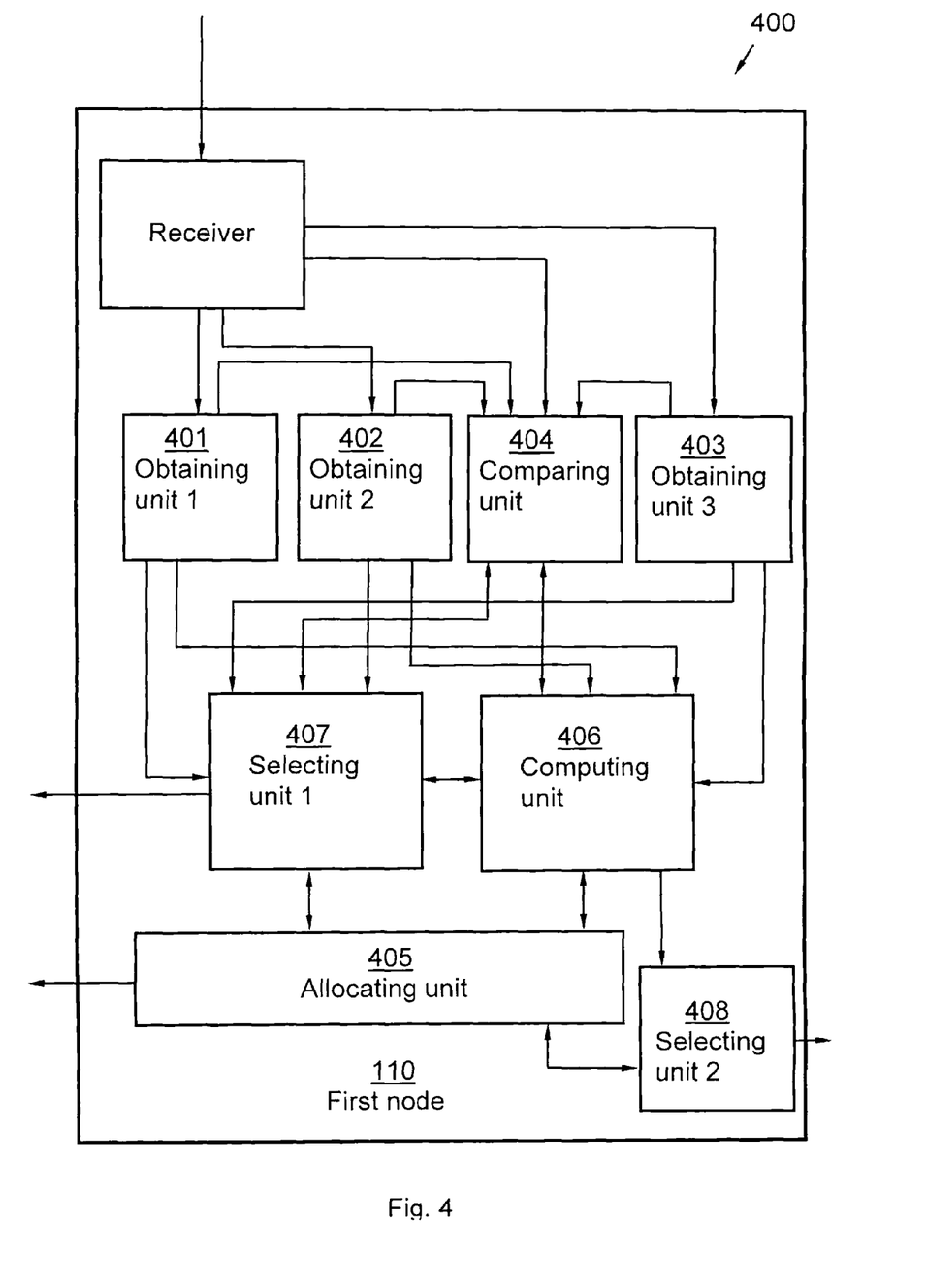
FIG. 4 is a block diagram illustrating an arrangement in a first node according to some embodiments.

FIG. 4 is a schematic block diagram illustrating an arrangement 400 in a first node 110. The arrangement 400 is adapted to perform the above described method steps 301-308, for selecting a transmission parameter. The transmission parameter to be selected may comprise at least one parameter out of the group: modulation and coding scheme, transmission power, number of MIMO streams, filtering coefficient. The transmission parameter is to be used when sending a signal over a radio channel 130 to a second node 120. The first node 110 and the second node 120 are comprised within a wireless communication network 100. The first node 110 may be represented by a base station. The second node 120 may be represented by a user equipment such as a mobile telephone. The radio channel 130 is allocated a bandwidth for signalling. However, according to some embodiments, the first node 110 is represented by a user equipment such as a mobile telephone. According to some embodiments, the first node 110 is represented by a control node 140, such as e.g. a Radio Network Controller. The second node 120 may according to some embodiments be represented by a base station.

In order to appropriately selecting transmission parameter, the arrangement 400 comprises a first obtaining unit 401. The first obtaining unit 401 is adapted to obtain an estimation of the signal quality of the radio channel 130.

According to some embodiments, an estimation of the signal quality of the radio channel 130, may be performed by receiving pilot signals from the second node 120, comparing the pilot signals with expected signal values and estimate a Signal to Noise Ratio based on the difference between the received pilot signals and the expected signal values.

However, according to some embodiments, an estimation of the signal quality of the radio channel 130, may be performed by another node such as e.g. the second node 120 or the control node 140, and the result may be provided to the first obtaining unit 401, comprised in the first node 110.

Such estimation may be performed in the second node 120 by receiving pilot signals from the first node 110, comparing the pilot signals with expected signal values and estimate a Signal to Noise Ratio based on the difference between the received pilot signals and the expected signal values. The estimated value may then be obtained by the first obtaining unit 401, comprised in the first node 110.

Also, the arrangement 400 comprises a second obtaining unit 402. The second obtaining unit 402 is adapted to obtain the size of the bandwidth for allocation to the radio channel 130.

Further, the arrangement 400 comprises a calculating unit 406. The calculating unit 406 is adapted to calculate a signal quality margin. The signal quality margin is calculated based on the bandwidth size.

The dependence of the bandwidth size when calculating the signal quality margin may according to some embodiments be such that a smaller bandwidth size generates an increased signal quality margin, and a broader bandwidth size, generates a smaller signal quality margin.

Further yet, the arrangement 400 comprises a selecting unit 407. The selecting unit 407 is adapted to select the transmission parameter based on the estimated signal quality of the radio channel 130 and the calculated signal quality margin.

According to some optional embodiments, the arrangement 400 may comprise a third obtaining unit 403. The third obtaining unit 403 is adapted to obtain a minimum threshold limit value.

Further, according to some embodiments, the arrangement 400 may comprise a comparison unit 404. The comparison unit 404 may be adapted to compare the minimum threshold limit bandwidth value with the bandwidth.

Further yet, according to some embodiments, the arrangement 400 may comprise an allocation unit 405. The allocation unit 405 is adapted to decline the allocation of the bandwidth to the radio channel 130, if the bandwidth is less than the minimum threshold limit bandwidth value.

Still further, according to some embodiments, the arrangement 400 may comprise a second selecting unit 408. The second selecting unit 408 is adapted to select a filtering coefficient, based on the bandwidth size.

According to some embodiments, the dependence of the bandwidth size when selecting filtering coefficients may be such that a smaller bandwidth size generates an increased filter length, and a broader bandwidth size generates a smaller filter length.

For the sake of clarity and in order not to render unnecessary aggravating circumstances for the uninitiated reader to comprehend the present first node 110, any internal electronics of the first node 110, not completely necessary for performing the present method according to steps 301-308, has been omitted from FIG. 4.

It is to be noted that the described units 401-408 comprised within the first node 110 are to be regarded as separate logical entities but not with necessity separate physical entities. Any, some or all of the units 401-408 may be comprised or co-arranged within the same physical unit. However, in order to facilitate the understanding of the functionality of the arrangement 400 in a first node 110, the comprised units 401-408 are illustrated as separate physical units in FIG. 4.

Some Particular Embodiments

The present method in the first node 110 for selecting a transmission parameter may be implemented through one or more processors, together with computer program code for performing the functions of the methods. The program code mentioned above may also be provided as a computer program product, for instance in the form of a data carrier carrying computer program code for performing the method according to the present invention when being loaded into the first node 110. The data carrier may be a CD ROM disc, a memory stick, or any other medium such as a disk or tape that can hold machine readable data. The computer program code can furthermore be provided as pure program code on a server and downloaded to the first node 110 remotely.

Thus a computer readable medium encoded with a computer program for selecting a transmission parameter may perform the method steps according to steps 301-308.

As will be appreciated by one of skill in the art, the present invention may be embodied as a method in the first node 110, an arrangement in the first node 110 or computer program products.

Accordingly, the present invention may take the form of an entirely hardware embodiment, a software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present methods may be written in any arbitrary programming language such as Java®, Smalltalk or C++. However, the computer program code for carrying out the steps of the present method may also be written in any conventional procedural programming languages, such as the "C" programming language and/or a lower level assembler language. The program code may execute entirely on the first node 110, partly on the first node 110, as a stand-alone software package, partly on the first node 110 and partly on a remote computing device or entirely on the remote computing device. In the latter scenario, the remote computing device may be connected to the first node 110 through a Local Area Network (LAN) or a Wide Area Network (WAN), or the connection may be made to an external computer, for example, through the Internet using an Internet Service Provider.

Furthermore, the present methods were described in part above with reference to flowchart illustrations and/or block diagrams of the first node 110, methods, and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram blocks.

Concerning Used Terminology

Further, by means of example and in order to simplify the comprehension, the term SINR has been consistently used in this text when describing a Signal to Noise and Interference Ratio, which is the ratio between the level of a desired signal to the level of background noise and signal disturbance. The higher the ratio, the less obtrusive is the background noise. However, there exist other acronyms which are sometimes used to describe the same or a similar ratio, like e.g. the Signal to Noise Ratio (SNR or S/N), Signal to Noise and Interference Ratio (SNIR), Signal to Interference Ratio (SIR) or an inversion of the ratio, like Interference to Signal Ratio, (ISR). The person skilled in the art immediately comprehends that any of these or similar ratios may be used in the context of this description instead of the SINR.

While the methods and arrangements described in this document are susceptible to various modifications and alternative forms, specific embodiments thereof are shown by way of example in the drawings and are herein described in detail. It should be understood, however, that there is no intent to limit the present methods and arrangements to the particular forms disclosed, but on the contrary, the present methods and arrangements are to cover all modifications, equivalents, and alternatives falling within the scope of the methods and arrangements as defined by the claims.

As used herein, the term "and/or" includes any and all combinations of one or more of the associated listed items.

Unless otherwise defined, all terms including technical and scientific terms used herein have the same meaning as commonly understood by one of ordinary skill in the art to which these methods and arrangements belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For purposes of illustration, embodiments of the present methods and arrangements are described herein in the context of a base station 110 and a user equipment 120. It will be understood, however, that the present methods and arrangements are not limited to such embodiments and may be embodied generally as any electronic device that includes radio signal propagation means thereon.

The invention claimed is:

1. A method in a first node for selecting a transmission parameter to be used when sending a signal over a radio channel to a second node, the first node and the second node being included within a wireless communication network, the radio channel to be allocated a bandwidth for signaling, and the method comprising:
    obtaining, by the first node, an estimation of the signal quality of the radio channel;
    obtaining, by the first node, a size of the bandwidth to be allocated to the radio channel;
    calculating, by the first node, a signal quality margin based on the bandwidth size; and
    selecting, by the first node, the transmission parameter based on the estimated signal quality of the radio channel and the calculated signal quality margin.

2. The method according to claim 1, further comprising:
    obtaining, by the first node, a minimum threshold limit bandwidth value;
    comparing, by the first node, the minimum threshold limit bandwidth value with the bandwidth sizel; and
    if the bandwidth size is less than the minimum threshold limit bandwidth value, declining, by the first node, to allocate the bandwidth to the radio channel.

3. The method according to claim 1, wherein said calculating comprises calculating a relatively larger signal quality margin if the bandwidth size is relatively narrow, and calculating a relatively smaller signal quality margin if the bandwidth size is relatively broad.

4. The method according to claim 1, wherein said calculating comprises:
    setting the signal quality margin to a value M1, if the bandwidth is broader than F1 MHz;
    setting the signal quality margin to a value M2, if the bandwidth is broader than F2 MHz but smaller than F1 MHz;
    setting the signal quality margin to a value M3, if the bandwidth is broader than F3 MHz but smaller than F2 MHz; and
    setting the signal quality margin to a value M4, if the bandwidth is smaller than F3 MHz;
    wherein value M1 is less than or equal to value M2, value M2 is less than or equal to value M3, and value M3 is less than or equal to value M4.

5. The method according to claim 1, wherein said selecting the transmission parameter comprises selecting at least one of a modulation and coding scheme, a transmission power, a number of MIMO streams, and a filtering coefficient.

6. The method according to claim 1, wherein said obtaining an estimation of the signal quality comprises receiving pilot signals from the second node, comparing the pilot signals with expected signal values, and estimating a Signal to Noise Ratio based on the difference between the received pilot signals and the expected signal values.

7. The method according to claim 1, further comprising selecting, by the first node, a filtering coefficient based on the bandwidth size.

8. The method according to claim 7, wherein selecting a filtering coefficient comprises selecting a relatively larger filter length if the bandwidth size is relatively narrow, and selecting a relatively smaller filter length if the bandwidth size is relatively broad.

9. A first node configured to select a transmission parameter to be used when sending a signal over a radio channel to a second node, the first node and the second node being included within a wireless communication network, the radio channel to be allocated a bandwidth for signaling, and the first node comprising:

a first obtaining circuit configured to obtain an estimation of the signal quality of the radio channel;

a second obtaining circuit configured to obtain a size of the bandwidth to be allocated to the radio channels;

a calculating circuit configured to calculate a signal quality margin based on the bandwidth sizes; and a selecting circuit configured to select the transmission parameter based on the estimated signal quality of the radio channel and the calculated signal quality margin.

10. The first node of claim 9, further comprising:

a third obtaining circuit configured to obtain a minimum threshold limit bandwidth value;

a comparing circuit configured to compare the minimum threshold limit bandwidth value with the bandwidth size; and an allocation circuit configured to decline to allocate the bandwidth to the radio channel if the bandwidth size is less than the minimum threshold limit bandwidth value.

11. The first node of claim 9, wherein the calculating circuit is configured to calculate a relatively larger signal quality margin if the bandwidth size is relatively narrow, and calculate a relatively smaller signal quality margin if the bandwidth size is relatively broad.

12. The first node of claim 9, wherein the calculating circuit is configured to:

set the signal quality margin to a value M1, if the bandwidth is broader than F1 MHz;

set the signal quality margin to a value M2, if the bandwidth is broader than F2 MHz but smaller than F1 MHz;

set the signal quality margin to a value M3, if the bandwidth is broader than F3 MHz but smaller than F2 MHz; and set the signal quality margin to a value M4, if the bandwidth is smaller than F3 MHz;

wherein value M1 is less than or equal to value M2, value M2 is less than or equal to value M3, and value M3 is less than or equal to value M4.

13. The first node of claim 9, wherein the selecting circuit is configured to select at least one of a modulation and coding scheme, a transmission power, a number of MIMO streams, and a filtering coefficient.

14. The first node of claim 9, wherein the first obtaining circuit is configured to obtain an estimation of the signal quality by receiving pilot signals from the second node, comparing the pilot signals with expected signal values, and estimating a Signal to Noise Ratio based on the difference between the received pilot signals and the expected signal values.

15. The first node of claim 9, further comprising a second selecting circuit configured to select a filtering coefficient based on the bandwidth size.

16. The first node of claim 15, wherein the second selecting circuit is configured to select a relatively larger filter length if the bandwidth size is relatively narrow, and select a relatively smaller filter length if the bandwidth size is relatively broad.

* * * * *

UNITED STATES PATENT AND TRADEMARK OFFICE
CERTIFICATE OF CORRECTION

PATENT NO.        : 8,681,721 B2                                           Page 1 of 1
APPLICATION NO.   : 12/993925
DATED             : March 25, 2014
INVENTOR(S)       : Furuskar et al.

It is certified that error appears in the above-identified patent and that said Letters Patent is hereby corrected as shown below:

On the Title Page, in item (57), under "ABSTRACT", in Column 2, Line 7, delete "the allocation" and insert -- the method comprises the step of obtaining the size of the bandwidth for allocation --, therefor.

In the Specification

In Column 3, Line 18, delete "station." and insert -- station, --, therefor.

In Column 3, Line 64, delete "glia" and insert -- alia --, therefor.

In Column 4, Line 26, delete "node" and insert -- node, --, therefor.

In Column 5, Line 67, delete "M1≤5 M2≤5 M3≤5 M4." and insert -- M1≤ M2≤ M3≤ M4. --, therefor.

In the Claims

In Column 10, Line 26, in Claim 2, delete "sizel;" and insert -- size; --, therefor.

In Column 11, Line 10, in Claim 9, delete "channels;" and insert -- channel; --, therefor.

In Column 11, Line 12, in Claim 9, delete "sizes;" and insert -- size; --, therefor.

Signed and Sealed this
Twenty-third Day of September, 2014

Michelle K. Lee
*Deputy Director of the United States Patent and Trademark Office*